(12) United States Patent
Ju et al.

(10) Patent No.: US 10,731,962 B1
(45) Date of Patent: Aug. 4, 2020

(54) TRANSPARENT CONSTRAINT APPARATUS FOR NORMAL DEFORMATION OF PLANAR MODEL

(71) Applicant: CHINA UNIVERSITY OF MINING AND TECHNOLOGY, BEIJING, Beijing (CN)

(72) Inventors: Yang Ju, Beijing (CN); Chang Lu, Beijing (CN); Peng Liu, Beijing (CN); Zhangyu Ren, Beijing (CN); Hongbin Liu, Beijing (CN); Xiaolan Li, Beijing (CN); Changbing Wan, Beijing (CN); Xiaodong Nie, Beijing (CN); Yating Wang, Beijing (CN)

(73) Assignee: CHINA UNIVERSITY OF MINING AND TECHNOLOGY, BEIJING, Beijing (CN)

( * ) Notice: Subject to any disclaimer, the term of this patent is extended or adjusted under 35 U.S.C. 154(b) by 0 days.

(21) Appl. No.: 16/634,134

(22) PCT Filed: May 8, 2019

(86) PCT No.: PCT/CN2019/085917
§ 371 (c)(1),
(2) Date: Jan. 25, 2020

(87) PCT Pub. No.: WO2019/237854
PCT Pub. Date: Dec. 19, 2019

(51) Int. Cl.
*G01B 5/30* (2006.01)
*G01B 5/00* (2006.01)
*G01N 3/08* (2006.01)

(52) U.S. Cl.
CPC ............ *G01B 5/30* (2013.01); *G01B 5/0004* (2013.01); *G01N 3/08* (2013.01)

(58) Field of Classification Search
CPC ............ G01B 5/30; G01B 5/0004; G01N 3/08
See application file for complete search history.

(56) References Cited

U.S. PATENT DOCUMENTS 8,853,613 B1 * 10/2014 Compton ............... G21K 1/006
250/251

FOREIGN PATENT DOCUMENTS

| CN | 103399139 A | 11/2013 |
| CN | 105424495 A | 3/2016 |

(Continued)

OTHER PUBLICATIONS

International Search Report for PCT/CN2019/085917 dated Aug. 1, 2019, ISA/CN.

*Primary Examiner* — Brandi N Hopkins
(74) *Attorney, Agent, or Firm* — Yue (Robert) Xu; Apex Attorneys at Law, LLP

(57) ABSTRACT

A transparent constraint apparatus for the normal deformation of a planar model, including rigid transparent retainer plates, a planar model, and magnetic force components. The magnetic force components are provided at edge positions of the rigid transparent retainer plates; the normal direction of the planar model is parallel to the normal direction of the two rigid transparent retainer plates, and said two retainer plates are symmetrically arranged relative to the plane of symmetry of the planar model; the magnetic force components are symmetrically arranged relative to the plane of symmetry of the planar model, mutually symmetrical magnetic force components producing mutually attractive magnetic force. The transparent constraint apparatus solves the problem of constraining the normal deformation of a planar model under planar-strain conditions during testing.

11 Claims, 2 Drawing Sheets

(56) References Cited

FOREIGN PATENT DOCUMENTS

| | | |
|---|---|---|
| CN | 107907424 A | 4/2018 |
| CN | 109115530 A | 1/2019 |
| GB | 931769 A | 7/1963 |
| JP | H09243702 A | 9/1997 |

* cited by examiner

TRANSPARENT CONSTRAINT APPARATUS FOR NORMAL DEFORMATION OF PLANAR MODEL

The present application is the national phase of International Application No. PCT/CN2019/085917, titled "TRANSPARENT CONSTRAINT APPARATUS FOR NORMAL DEFORMATION OF PLANAR MODEL", filed on May 8, 2019, and the entire disclosure thereof is incorporated herein by reference.

FIELD

The present application relates to the technical field of stress and deformation measurement of laboratory experimental models, in particular to a transparent constraint technique for constraining normal deformation of a plane model.

BACKGROUND

Accurately understanding and quantitatively analyzing the stress state and evolution law of engineering rock mass (facilities) is a basis for determining construction plans and preventing and controlling sudden engineering disasters in mining, petroleum and civil engineering. For example, in construction projects such as urban traffic tunnels, railway and highway tunnels, submarine traffic tunnels and pipelines, coal mine roadways, water conveyance tunnels and the like, the stress distribution and evolution law of the engineering rock mass (facilities) are required to be obtained for the design and stability analysis of the above objects. In general, although the engineering structure is in a three-dimensional stress state, for the engineering structure having the size of the third direction much larger than that of the other two directions, the stress state thereof can generally be abstracted and simplified into a plane strain problem.

Laboratory experiments, especially similar simulation experiments, have been widely used in the research of plane strain problems. Compared with theoretical analyses, stress analyses of research objects with relatively complex geometric shapes can be performed through similar simulation experiments; compared with numerical calculations, controversial operation processes, such as mesh division and algorithm selection, are not required in the similar simulation experiments; compared with field measurement, similar simulation experiments have the advantages of low cost, repeatability, and controllable research variables. Therefore, similar simulation experiments are of great value for the stress analysis of engineering rock mass (facilities) with complex mechanisms, numerous influencing factors and different working conditions.

The plane strain problem is studied in the similar simulation experiment, and rigid metal plates are widely used to constrain the deformation in the normal directions of two surfaces of the experimental model, so that the experimental model can satisfy the conditions of the plane strain problem. However, since the rigid metal plate is not transparent, the change processes of the physical characteristics on the surface of or inside the similar experimental model cannot be displayed in this kind of solutions, which makes it impossible for the researchers to visually observe the stress, deformation and failure phenomena of the experimental model. Moreover, as a branch of the similar simulation experiments, two-dimensional photoelastic similar simulation experiments often employ transmissive optical systems, if rigid metal plates are mounted at two sides of the plane model, it is difficult to carry out this type of photoelastic experiments.

Baffles made of rigid transparent materials provide a solution to the above problems, which have been researched in related patents and literatures in recent years. In summary, according to the conventional technical solutions of baffles made of rigid transparent materials, bolts are generally used to fix the rigid transparent baffles, and the experimental model is located between two rigid transparent baffles, so that the deformation of the experimental model in one direction is constrained by the rigid transparent baffles. However, the above solution has the following disadvantages. First, it is difficult to tighten multiple bolts at the same time, and it is also difficult to ensure that each bolt provides an exactly equal tightening force to the rigid transparent baffles; with the above solution, additional stress of the experimental model are easily generated; although the difference of the tightening force has relatively small effect on the similar simulation model made of soil and sand material, it has a great influence on the similar simulation model made of the material with the stress birefringence effect. Second, the mounting steps of bolts, the rigid transparent baffles and the experimental model are complicated, and it takes a long time to adjust the pre-tightening force of each bolt. Third, according to the technical solutions of the disclosed patents, the constraint methods based on the magnetism rigid transparent baffle plates are rarely used for assembling the rigid transparent baffle plates and the experimental model.

SUMMARY

In order to reduce the additional stress on the experimental model when the bolts are fastened to the rigid transparent baffles in the conventional technical solution, and to save time and labor in parallel positioning and assembling the rigid transparent baffles and the experimental model, a transparent device for constraining normal deformation of a plane model is provided according to the present application.

In order to achieve the above objects, a transparent device for constraining normal deformation of a plane model is provided, including:

a first transparent baffle and a second transparent baffle provided opposite to the first transparent baffle;

a first magnetic component is arranged at the first transparent baffle, and a second magnetic component corresponding to the first magnetic component is arranged at the second transparent baffle, in use, the plane model is constrained between the first transparent baffle and the second transparent baffle by mutual attraction of the first magnetic component and the second magnetic component.

Preferably, the first magnetic component includes an active magnetic component or a passive magnetic component; and the second magnetic component includes an active magnetic component or a passive magnetic component.

Preferably, both a normal direction of the first transparent baffle and a normal direction of the second transparent baffle are parallel to a normal direction of the plane model, the first transparent baffle and the second transparent baffle are symmetrically arranged with respect to the plane model, and the first magnetic component and the second magnetic component are symmetrically arranged with respect to the plane model.

Preferably, the first magnetic component is mounted at an edge of the first transparent baffle, and the second magnetic component is mounted at an edge of the second transparent baffle.

Preferably, at least one first magnetic component having a U-shaped structure is arranged at a top portion and/or a middle portion of the first transparent baffle, and a groove of the first magnetic component having the U-shaped structure is coupled to an edge of the first transparent baffle; at least one first magnetic component having an H-shaped structure is arranged at a bottom portion of the first transparent baffle, an upper groove of the first magnetic component having the H-shaped structure is coupled to the edge of the first transparent baffle, and a lower groove of the first magnetic component having the H-shaped structure is coupled to a protrusion of a lower base.

Preferably, at least one second magnetic component having a U-shaped structure is arranged at a top portion and/or a middle portion of the second transparent baffle, and a groove of the second magnetic component having the U-shaped structure is coupled to an edge of the second transparent baffle; at least one second magnetic component having an H-shaped structure is provided at a bottom portion of the second transparent baffle, an upper groove of the second magnetic component having the H-shaped structure is coupled to the edge of the second transparent baffle, and a lower groove of the second magnetic component having the H-shaped structure is coupled to a protrusion of the lower base.

Preferably, a first interlayer is provided between the groove of the first magnetic component having the U-shaped structure and the edge of the first transparent baffle;

another first interlayer is provided between the upper groove of the first magnetic component having the H-shaped structure and the edge of the first transparent baffle;

a second interlayer is provided between the groove of the second magnetic component having the U-shaped structure and the edge of the second transparent baffle; and another second interlayer is provided between the upper groove of the second magnetic component having the H-shaped structure and the edge of the second transparent baffle.

Preferably, the first magnetic component extends in a thickness direction of the first transparent baffle and has a first protrusion protruding from a plane of the first transparent baffle toward the plane model;

the second magnetic component extends in a thickness direction of the second transparent baffle and has a second protrusion protruding from a plane of the second transparent baffle toward the plane model; and in a case that the plane model does not receive a load, a sum of thicknesses of the first protrusion of the first magnetic component and the second protrusion of the second magnetic component which are symmetrically arranged at the first transparent baffle and second transparent baffle and thicknesses of the corresponding first interlayer and second interlayer is equal to the thickness of the plane model.

Preferably, the passive magnetic component is a permanent magnet, and the active magnetic component includes a metal coil and a magnetic shield, the magnetic shield is a hollow structure which is circumferentially closed and axially unblocked, a curved surface of the metal coil is wrapped by the magnetic shield; the active magnetic component further includes a power cord, an internal wire and a transformer, and the power cord, the transformer, the internal wire and the metal coil are connected in sequence.

Preferably, the first magnetic component is mounted in a region enclosed by an edge of the first transparent baffle, and the second magnetic component is mounted in a region enclosed by an edge of the second transparent baffle.

It can be seen from the above technical solution that, the transparent device for constraining normal deformation of the plane model according to the present application is provided to solve the constraint problem of the normal deformation of the plane model under the plane strain condition, especially the constraint problem of the normal deformation of the plane photoelastic model, and the problems of parallel positioning and assembly of the rigid transparent baffles and the plane model in the experiment. The additional stress caused by bolt fastening in the conventional technology is significantly reduced according to the present application, which creates conditions for accurately obtaining the stress field distribution of the experimental model in the plane strain state and quantitatively and visually representing the evolution of the stress field.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only some examples of the present application, and for those skilled in the art, other drawings may be obtained based on these drawings without any creative efforts.

Figure 1:
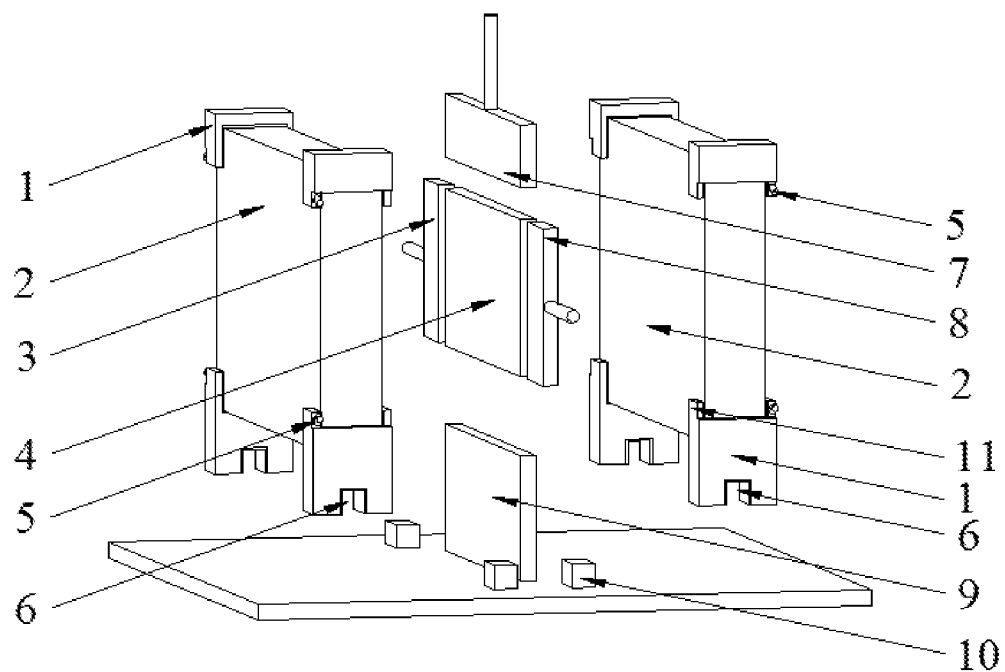
FIG. 1 is an overall layout of active magnetic components and a plane model according to an embodiment of the present application.

| Reference Numerals: | | | |
|---|---|---|---|
| 1 | active magnetic component, | 2 | rigid transparent baffle, |
| 3 | left loading clamp, | 4 | plane model, |
| 5 | power cord, | | |
| 6 | bottom groove of magnetic component, | | |
| 7 | upper loading clamp, | 8 | right loading clamp, |
| 9 | lower base, | 10 | fixing protrusion, |
| 11 | side protrusion of magnetic component, | 12 | elastic material interlayer, |
| 13 | fixing groove, | 14 | metal coil, |
| 15 | magnetic shield, | 16 | internal wire, |
| 17 | transformer, | 18 | passive magnetic component. |

DETAILED DESCRIPTION

The technical solution according to the embodiments of the present application will be described clearly and completely as follows in conjunction with the accompany drawings in the embodiments of the present application. It is obvious that the described embodiments are only a part of the embodiments according to the present application, rather than all of the embodiments. All the other embodiments obtained by those skilled in the art based on the embodiments in the present application without any creative work belong to the scope of protection of the present application.

Embodiment 1

A transparent device for constraining normal deformation of a plane model is provided according to an embodiment of the present application. The transparent device includes two rigid transparent baffles 2 (that is, a first transparent baffle and a second transparent baffle) and active magnetic components 1 (that is, a first magnetic component having a U-shaped structure, a second magnetic component having the U-shaped structure, a first magnetic component having an H-shaped structure and a second magnetic component having the H-shaped structure). The structure of the transparent device can be seen by reference to FIG. 1, and the active magnetic components 1 are mounted at the two rigid transparent baffles 2 respectively and are able to be mutually attracted.

It can be seen from the above technical solution that, with the constraining device according to the embodiment of the present application, the two rigid transparent baffles 2 can be arranged at two sides of a plane model 4, and the active magnetic components 1 generate mutually attractive magnetic forces, so that the rigid transparent baffles 2 are able to clamp the plane model 4, to constrain deformation of the plane model 4 in a normal direction. Specific advantages of employing the active magnetic components 1 are as follows. First, strength and direction of a magnetic field are accurately adjusted and controlled by adjusting magnitude and direction of an electrical current. Second, by supplying power to all of the active magnetic components 1 at the same time, unevenness of contact between the rigid transparent baffles 2 and the plane model 4 is weakened, thereby reducing an additional stress applied on the plane model 4 when the rigid transparent baffles 2 are fastened by bolts in the conventional technology. Third, with this solution, the rigid transparent baffles 2 and the plane model 4 can be parallelly positioned and assembled with less time and work.

Specifically, normal directions of the two rigid transparent baffles 2 are parallel to a normal direction of the plane model 4, and the two rigid transparent baffles 2 are symmetrically arranged with respect to the plane model 4; the active magnetic components 1 are symmetrically arranged and generate mutually attractive magnetic forces. The device according to the embodiment of the present application is particularly applicable for constraining the normal deformation of the plane model 4 in a photoelastic experiment. Of course, the device can also be used as a model constraining device in other experimental systems, for example, in a case that the active magnetic components 1 are mounted on a non-transparent baffle, and for example, mutual magnetic forces may also be taken as repulsive forces for maintaining a space, thereby meeting requirements of different situations.

In order to further optimize the above technical solution, and to effectively achieve parallel positioning and assembly of the rigid transparent baffles 2 and the plane model 4, the number of the active magnetic components 1 mounted at each of the rigid transparent baffles 2 is plural, and positions of the active magnetic components 1 mounted at one of the rigid transparent baffles 2 are in one-to-one correspondence with positions of the active magnetic components 1 mounted at the other of the rigid transparent baffles 2, and the structure thereof can be seen by reference to FIG. 1.

In this embodiment, multiple active magnetic components 1 are magnetic components having the U-shaped structure mounted at a top portion and/or a middle portion of each of the rigid transparent baffles 2, and/or, the multiple active magnetic components 1 are magnetic components having the H-shaped structure mounted at a bottom portion of each of the rigid transparent baffles 2 and each has a bottom groove of magnetic component 6 (that is, a lower groove of the first magnetic component having the H-shaped structure, and a lower groove of the second magnetic component having the H-shaped structure) coupled to a fixing protrusion 10 (that is, a protrusion of the lower base) of a lower base 9, and the structure thereof can be seen by reference to FIG. 1. The plane model 4 receives a uniaxial or biaxial load by a servo-controlled universal testing machine. A platform of the above machine, for placing the plane model 4, is provided with fixing protrusions 10, and a shape and size of the bottom groove of magnetic component 6 match with that of the corresponding fixing protrusion 10. The active magnetic components 1 having the U-shaped structure and the active magnetic components 1 having the H-shaped structure can be well adapted to a plate-like shape of the rigid transparent baffle 2. Specifically, the rigid transparent baffle 2 has the plate-like shape, and is made of a transparent material having an unobvious or no birefringent effect, which is applicable in the photoelastic experiment.

Preferably, the active magnetic components 1 are mounted at an edge of the rigid transparent baffle 2, to avoid affecting researchers' observation of forces, deformation, and failure of the plane model 4, and to facilitate performance of the photoelastic experiment. Of course, the active magnetic components 1 may also be arranged at positions which are not at an edge of the rigid transparent baffle 2, as long as the researchers' observation and experimental optical paths are not affected, for example, the active magnetic components 1 may be embedded inside the rigid transparent baffle 2.

Figure 2:
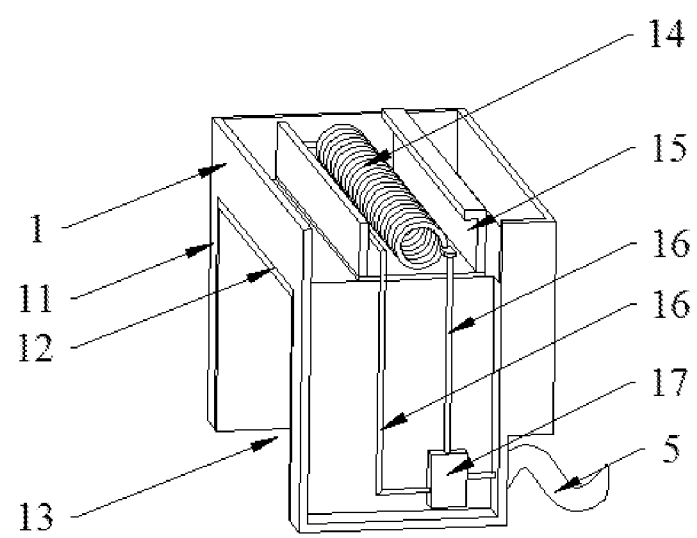
FIG. 2 is an internal structural view of one of the active magnetic components according to the embodiment of the present application.

Specifically, the active magnetic components 1 are each provided with a fixing groove 13 (that is, an upper groove of the first magnetic component having the H-shaped structure, an upper groove of the second magnetic component having the H-shaped structure, a groove of the first magnetic component having the U-shaped structure and a groove of the second magnetic component having the U-shaped structure) for coupling with the edge of the rigid transparent baffle 2, which is convenient for assembly, and the structure thereof can be seen by reference to FIGS. 1 and 2. Of course, operators can also mount the active magnetic components 1 to the rigid transparent baffle 2 by other means of assembly.

In order to further optimize the above technical solution, the active magnetic component 1 further has an elastic material interlayer 12 (that is, a first interlayer and a second interlayer) mounted between the fixing groove 13 and the rigid transparent baffle 2. The structure can be seen by reference to FIG. 2, and the elastic material interlayer 12 is used to protect a surface of the rigid transparent baffle 2 from being damaged by the fixing groove 13. It should be noted that, the elastic material interlayer 12 may affect an accuracy of achieving the plane strain condition to a certain extent, but an influence degree is limited.

In this embodiment, the active magnetic component 1 has a side protrusion of magnetic component 11 (that is, a first protrusion and a second protrusion) protruding from a thickness direction of the rigid transparent baffle 2, and the structure thereof can be seen by reference to FIGS. 1 and 2.

In a case that the plane model does not receive a load, a sum of thicknesses of side protrusions 11 of two magnetic components mounted at corresponding positions of the two rigid transparent baffles 2 and thicknesses of two elastic material interlayers 12 is equal to a thickness of the plane model 4; and after the active magnetic components 1 at the two sides of the plane model 4 are mutually attracted to be fitted to each other, a width of a gap between the two rigid transparent baffles 2 is equal to the thickness of the plane model 4, so as to effectively achieve constraint of the normal deformation of the plane model 4.

Specifically, the active magnetic component 1 includes a metal coil 14 and a magnetic shield 15, and the structures thereof can be seen by reference to FIG. 2.

The magnetic shield 15 has a hollow structure which is circumferentially closed and axially unblocked. A curved surface of the metal coil 14 is wrapped by the magnetic shield 15, so that a magnetic field of the metal coil 14 is distributed only in an axial direction of the metal coil 14, which facilitates mutual attraction of the two symmetrical active magnetic components 1, so as to position and assemble the rigid transparent baffles 2 and the plane model 4 in parallel. The plane model 4 is taken as a plane for symmetry, in the mutually symmetrical active magnetic components 1, currents in mutually symmetrical metal coils 14 generate magnetic forces that cause the two symmetrical active magnetic components 1 to attract each other. The active magnetic structures are employed in this solution, and passive magnetic structures may also be employed, such as permanent magnet components.

In order to further optimize the above technical solution, the active magnetic component 1 further includes a power cord 5, an internal wire 16 and a transformer 17, and the structures thereof can be seen by reference to FIG. 2.

The power cord 5, the transformer 17, the internal wire 16 and the metal coil 14 are connected in sequence. A current is supplied to the active magnetic component 1 via the power cord 5, and the current is converted to a voltage having an appropriate magnitude by the transformer 17, and then the converted current is delivered to the metal coil 14 via the internal wire 16.

The present solution is further described in detail hereinafter in conjunction with specific embodiments.

A specific layout of the technical solution according to the present application is shown in FIG. 1. According to the present application, the transparent device mainly includes eight active magnetic components 1, two rigid transparent baffles 2 and a plane model 4. The active magnetic components 1 are mounted at four corner edges of each of the rigid transparent baffles 2. A normal direction of the plane model 4 is parallel to normal directions of the two rigid transparent baffles 2, and the two rigid transparent baffles 2 are symmetrically arranged with respect to the plane model 4. The plane model 4 receives a uniaxial or biaxial load by a servo-controlled universal testing machine. A loading portion of the experimental machine includes a lower base 9, a left loading clamp 3, an upper loading clamp 7 and a right loading clamp 8. The plane model 4 is placed above the lower base 9, and the left loading clamp 3, the upper loading clamp 7, the right loading clamp 8 and the lower base 9 apply a load or constraint to four sides of the plane model 4, thereby fixing the plane model 4. Each of the active magnetic components 1 at a top portion of each of the rigid transparent baffles 2 is of a U-shaped structure. Each of the active magnetic components 1 at a bottom portion of the rigid transparent baffle 2 is of an H-shaped structure, and the active magnetic component 1 at the bottom portion of the rigid transparent baffle 2 is provided with a bottom groove of magnetic component 6. The platform of the above machine, for placing the plane model 4, is provided with fixing protrusions 10, and a shape and size of the bottom groove of magnetic component 6 match with that of corresponding one of the fixing protrusions 10. In a case that the plane model 4 does not receive a load, a thickness of the plane model 4 is equal to a sum of thicknesses of side protrusions 11 of two magnetic components and thicknesses of two elastic material interlayers 12. A power cord 5 is led from each of the active magnetic components 1.

The internal structure of the active magnetic component 1 is as shown in FIG. 2. Each of the active magnetic components 1 includes a power cord 5, a side protrusion of magnetic component 11, an elastic material interlayer 12, a fixing groove 13, a metal coil 14, a magnetic shield 15, an internal wire 16, and a transformer 17. From the bottom portion to the top portion of the active magnetic component 1, structural features of the active magnetic components 1 are sequentially represented as follows. A corner of the rigid transparent baffle 2 is coupled to the fixing groove 13; the elastic material interlayer 12 is mounted between the fixing groove 13 and the rigid transparent baffle 2 for protecting a surface of the rigid transparent baffle 2 from being damaged by the fixing groove 13; a current is supplied to the active magnetic component 1 via the power cord 5, and the current is converted into a voltage having an appropriate magnitude by the transformer 17, and then the converted current is delivered to the metal coil 14 via the internal wire 16; the metal coil 14 is made of a metal material and is of a spiral structure; a curved surface of the metal coil 14 is wrapped by the magnetic shield 15, and the magnetic shield 15 has a hollow structure which is circumferentially closed and axially unblocked, so that a magnetic field of the metal coil 14 is distributed only in an axial direction of the metal coil 14.

Specific application steps of the present application include: first, the elastic material interlayer 12 is inlaid in the fixing groove 13 of each active magnetic component 1; second, the active magnetic component 1 inlaid with the elastic material interlayer 12 is coupled to a corner of the rigid transparent baffle 2, and each of corners of the rigid transparent baffle 2 is mounted with one active magnetic component 1 inlaid with the elastic material interlayer 12; third, the plane model 4 is placed above the lower base 9; fourth, the left loading clamp 3, the upper loading clamp 7 and the right loading clamp 8 are moved, to cooperate together with the lower base 9 to apply load or constraint to the four sides of the plane model 4; fifth, two sets of active magnetic components 1 and rigid transparent baffles 2 are placed at front and rear sides of the plane model 4, and each of the fixing protrusions 10 is inserted into the corresponding bottom groove of magnetic component 6; sixth, each of the active magnetic components 1 is powered via the power cord 5; and seventh, the plane model 4 is taken as the plane of symmetry, the mutually symmetrical active magnetic components 1 generate magnetic forces that attract each other, so as to clamp the plane model 4, and thereby constraining the deformation of the plane model 4 in the normal direction.

Embodiment 2

A transparent device for constraining normal deformation of a plane model is provided according to an embodiment of the present application. The transparent device includes two rigid transparent baffles 2 (that is, a first transparent baffle and a second transparent baffle) and passive magnetic components 18 (that is, a first magnetic component having a U-shaped structure, a second magnetic component having the U-shaped structure, a first magnetic component having an H-shaped structure and a second magnetic component having the H-shaped structure). The structure of the transparent device can be seen by reference to FIG. 3, and the passive magnetic components 18 are mounted at the two rigid transparent baffles 2 respectively and are able to be mutually attracted.

With the constraining device according to the embodiment of the present application, the two rigid transparent baffles 2 can be arranged at two sides of a plane model 4, and the passive magnetic components 18 generate mutually attractive magnetic forces, so that the rigid transparent baffles 2 are able to clamp the plane model 4, to constrain deformation of the plane model 4 in a normal direction. With this solution, an additional stress applied on the plane model 4 when the rigid transparent baffles 2 are fastened by bolts in the conventional technology is reduced, and the rigid transparent baffles 2 and the plane model 4 can be parallelly positioned and assembled with more time and labor saved.

Specifically, normal directions of the two rigid transparent baffles 2 are parallel to a normal direction of the plane model 4, and the two rigid transparent baffles 2 are symmetrically arranged with respect to the plane model 4; by taking the plane model 4 as a plane of symmetry, the passive magnetic components 18 symmetrical arranged at the two rigid transparent baffles 2 and generate mutually attractive magnetic forces. The device according to the embodiment of the present application is particularly applicable for constraining the normal deformation of the plane model 4 in a photoelastic experiment. Of course, the device can also be used as a model constraining device in other experimental systems, for example, in a case that the passive magnetic components 18 are mounted on a non-transparent baffle, and for example, mutual magnetic forces may also be taken as repulsive forces for maintaining a space, thereby meeting requirements of different situations.

Figure 3:
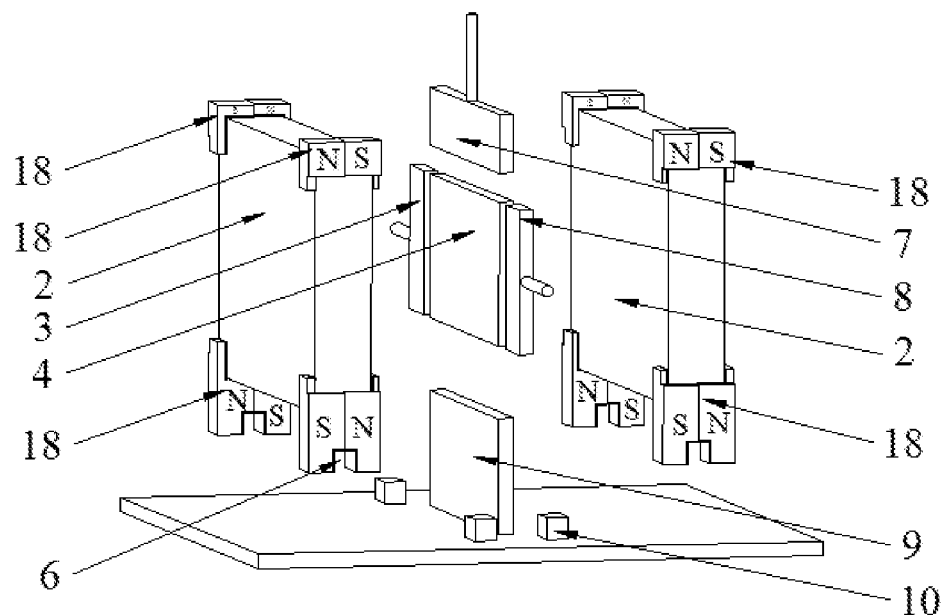
FIG. 3 is an overall layout of passive magnetic components and a plane model according to an embodiment of the present application.

In order to further optimize the above technical solution, the number of the passive magnetic components 18 mounted at each of the rigid transparent baffles 2 is plural, the positions of the passive magnetic components 18 mounted at one of the rigid transparent baffles 2 are in one-to-one correspondence with positions of the passive magnetic components 18 mounted at the other of the rigid transparent baffles 2, and the structure thereof can be seen by reference to FIG. 3.

Figure 4:
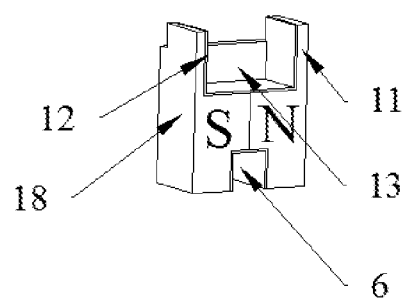
FIG. 4 is a view showing the structure of an H-shaped passive magnetic component according to the embodiment of the present application.
Figure 5:
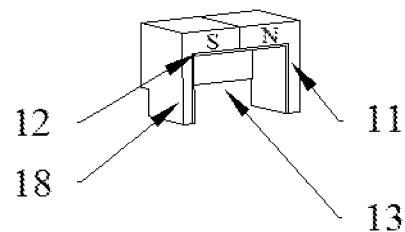
FIG. 5 is a view showing the structure of a U-shaped passive magnetic component according to the embodiment of the present application.

In this embodiment, as shown in FIGS. 4 and 5, the multiple passive magnetic components 18 having U-shaped structures are mounted at a top portion and/or a middle portion of each of the rigid transparent baffles 2; and/or, the multiple passive magnetic components 18 having H-shaped structures are mounted at a bottom portion of each of the rigid transparent baffles 2 and each has a bottom groove of magnetic component 6 (that is, a lower groove of the first magnetic component having the H-shaped structure and a lower groove of the second magnetic component having the H-shaped structure) coupled to a fixing protrusion 10 (that is, a protrusion of the lower base) of the lower base 9. The plane model 4 receives a uniaxial or biaxial load by a servo-controlled universal testing machine. A platform of the above machine, for placing the plane model 4, is provided with fixing protrusions 10, and a shape and size of the bottom groove of magnetic component 6 match with that of the corresponding fixing protrusion 10. The passive magnetic components 18 having the U-shaped structure and the passive magnetic components 18 having the H-shaped structure can be well adapted to a plate-like shape of the rigid transparent baffle 2. Specifically, the rigid transparent baffle 2 has the plate-like shape, and is made of a transparent material having an unobvious or no birefringent effect, which is applicable in the photoelastic experiment.

Preferably, the passive magnetic components 18 are mounted at an edge of the rigid transparent baffle 2, to avoid affecting researchers' observation of forces, deformation, and failure of the plane model 4, and to facilitate performance of the photoelastic experiment. Of course, the passive magnetic components 18 may also be arranged at positions which are not at an edge of the rigid transparent baffle 2, as long as the researchers' observation and experimental optical paths are not affected, for example, the passive magnetic components 18 may be embedded inside the rigid transparent baffle 2.

Specifically, the passive magnetic components 18 are each provided with a fixing groove 13 (that is, an upper groove of the first magnetic component having the H-shaped structure, an upper groove of the second magnetic component having the H-shaped structure, a groove of the first magnetic component having the U-shaped structure and a groove of the second magnetic component having the U-shaped structure) for coupling with the edge of the rigid transparent baffle 2, which is convenient for assembly, and the structure thereof can be seen by reference to FIGS. 3, 4 and 5. Of course, the passive magnetic components 18 may be mounted to the rigid transparent baffle 2 by other means of assembly.

In order to further optimize the above technical solution, the passive magnetic component 18 further has an elastic material interlayer 12 (that is, a first interlayer and a second interlayer) mounted between the fixing groove 13 and the rigid transparent baffle 2. The structure can be by reference to FIGS. 4 and 5, and the elastic material interlayers 12 is used to protect a surface of the rigid transparent baffle 2 from being damaged by the fixing groove 13. It should be noted that, the elastic material interlayer 12 may affect an accuracy of achieving the plane strain condition to a certain extent, but an influence degree is limited.

In this embodiment, the passive magnetic component 18 has a side protrusion of magnetic component 11 (that is, a first protrusion and a second protrusion) protruding in a thickness direction of the rigid transparent baffle 2, and the structure thereof can be seen by reference to FIGS. 4 and 5.

In a case that the plane model does not receive a load, a sum of thicknesses of side protrusions 11 of two magnetic components mounted at corresponding positions of the two rigid transparent baffles 2 and thicknesses of two elastic material interlayers 12 is equal to a thickness of the plane model 4; and after the passive magnetic components 18 at the two sides of the plane model 4 are mutually attracted to be fitted to each other, a width of a gap between the two rigid transparent baffles 2 is equal to the thickness of the plane model 4, so as to effectively achieve constraint of the normal deformation of the plane model 4.

Specifically, the passive magnetic components 18 are made of a permanent magnetic material, and each of the passive magnetic components 18 includes two magnetic poles, namely, an N pole and an S pole. The passive magnetic component 18 having the U-shaped structure includes a side protrusion of magnetic component 11, an elastic material interlayer 12 and a fixing groove 13; and the passive magnetic component 18 having the H-shaped structure include a side protrusion of magnetic component 11, an elastic material interlayer 12, a fixing groove 13, and a bottom groove of magnetic component 6. The structure of the passive magnetic component 18 can be seen by reference to FIGS. 4 and 5.

A coupling relationship between the passive magnetic components 18 and the rigid transparent baffles 2 is as follows. Each of corners of the rigid transparent baffle 2 is coupled to a corresponding fixing groove 13; the elastic material interlayer 12 is mounted between the fixing groove 13 and the rigid transparent baffle 2 for protecting the surface of the rigid transparent baffles 2 from being damaged by the fixing groove 13.

The present solution is further described in detail hereinafter in conjunction with specific embodiments.

A specific layout of the technical solution according to the present application is shown in FIG. 3. According to the present application, the transparent device mainly includes eight passive magnetic components 18, two rigid transparent baffles 2 and a plane model 4. The passive magnetic components 18 are mounted at four corner edges of each of the rigid transparent baffles 2. A normal direction of the plane model 4 is parallel to normal directions of the two rigid transparent baffles 2, and the two rigid transparent baffles 2 are symmetrically arranged with respect to the plane model 4. With the plane model 4 as a plane of symmetry, symmetrical magnetic poles of the passive magnetic components 18 are opposite. The plane model 4 receives a uniaxial or biaxial load by a servo-controlled universal testing machine. A loading portion of the experimental machine includes a lower base 9, a left loading clamp 3, an upper loading clamp 7 and a right loading clamp 8. The plane model 4 is placed above the lower base 9, and the left loading clamp 3, the upper loading clamp 7, the right loading clamp 8 and the lower base 9 apply a load or constraint to four sides of the plane model 4, thereby fixing the plane model 4. Each of the passive magnetic components 18 at a top portion of each of the rigid transparent baffles 2 is of a U-shaped structure. Each of the passive magnetic components 18 at a bottom portion of the rigid transparent baffle 2 is of an H-shaped structure, and the passive magnetic component 18 at the bottom portion of the rigid transparent baffle 2 is provided with a bottom groove of magnetic component 6. The platform of the above servo-controlled machine, for placing the plane model 4, is provided with fixing protrusions 10, and a shape and size of the bottom groove of magnetic component 6 match with that of corresponding one of the fixing protrusions 10. In a case that the plane model 4 does not receive a load, a thickness of the plane model 4 is equal to a sum of thicknesses of side protrusions 11 of two magnetic components and thicknesses of two elastic material interlayers 12.

Specific application steps of the present application include: first, the elastic material interlayer 12 is inlaid in the fixing groove 13 of each passive magnetic component 18; second, the passive magnetic component 18 inlaid with the elastic material interlayer 12 is coupled to a corner of the rigid transparent baffle 2, and each of corners of the rigid transparent baffle 2 is mounted with one passive magnetic component 18 inlaid with the elastic material interlayer 12; third, the plane model 4 is placed above the lower base 9; fourth, the left loading clamp 3, the upper loading clamp 7 and the right loading clamp 8 are moved, to cooperate together with the lower base 9 to apply load or constraint to the four sides of the plane model 4; fifth, two sets of passive magnetic components 18 and rigid transparent baffles 2 are placed at front and rear sides of the plane model 4, and each of the fixing protrusions 10 is inserted into the corresponding bottom groove of magnetic component 6; sixth, with the plane model 4 as the plane of symmetry, the magnetic poles of the passive magnetic components 18 which are symmetric with each other are opposite, and mutually attractive magnetic forces are generated, so as to clamp the plane model 4, and thereby constraining the deformation of the plane model 4 in the normal direction.

The following technical solutions are provided according to the present application.

A transparent device for constraining normal deformation of a plane model, including:

two rigid transparent baffles; and magnetic components which are mounted at the two rigid transparent baffles respectively and able to be attracted by each other.

Preferably, the magnetic components are active magnetic components and/or passive magnetic components; and the passive magnetic components are permanent magnets.

Preferably, normal directions of the two rigid transparent baffles are parallel to a normal direction of a plane model, the two rigid transparent baffles are symmetrically arranged with respect to the plane model, and the magnetic components on the two rigid transparent baffles are also symmetrically distributed with respect to the plane model.

Preferably, the number of the active magnetic components mounted at each of the rigid transparent baffles is plural, and positions of the active magnetic components mounted at one of the rigid transparent baffles are in one-to-one correspondence with positions of the active magnetic components mounted at the other of the rigid transparent baffles.

Preferably, each of the magnetic components is mounted at an edge of the rigid transparent baffle.

Preferably, the multiple magnetic components having U-shaped structures are mounted on at a top portion and/or a middle portion of each of the rigid transparent baffles; and/or, the multiple magnetic components having H-shaped structures are mounted at a bottom portion of each of the rigid transparent baffles and each has a bottom groove of magnetic component coupled to a fixing protrusion of the lower base.

Preferably, each of the magnetic components has a fixing groove for coupling to an edge of the rigid transparent baffle.

Preferably, the magnetic component further has an elastic material interlayer mounted between the fixing groove and the rigid transparent baffle.

Preferably, the magnetic component has a side protrusion of magnetic component protruding in a thickness direction of the rigid transparent baffle.

In a case that the plane model does not receive a load, a sum of thicknesses of side protrusions of two symmetrical magnetic components arranged at the two rigid transparent baffles and thicknesses of two elastic material interlayers is equal to a thickness of the plane model.

Preferably, the active magnetic component includes a metal coil and a magnetic shield; the magnetic shield has a hollow structure which is circumferentially closed and axially unblocked, and a curved surface of the metal coil is wrapped by the magnetic shield.

Preferably, the active magnetic component further includes a power cord, an internal wire and a transformer; and the power cord, the transformer, the internal wire, and the metal coil are connected in sequence.

In summary, a transparent device for constraining normal deformation of a plane model is provided according to the present application, including rigid transparent baffles, a plane model, and magnetic components. The magnetic components are mounted on edges of the rigid transparent baffles; a normal direction of the plane model is parallel to normal directions of two rigid transparent baffles, and the two rigid transparent baffles are symmetrically arranged with respect to the plane model; the magnetic components are symmetrically distributed with respect to the plane model, and mutually symmetrical magnetic components generate mutually attractive magnetic forces. According to the present application, a technical solution is provided to solve problems of constraining normal deformation of the plane model under a plane strain condition in an experiment, and to solve problems of parallel positioning and assembly of the rigid transparent baffles and the plane model in the experiment. An additional stress caused by bolt fastening in the conventional technology is significantly reduced according to the present application, which creates conditions for accurately obtaining stress field distribution of an experimental model in a plane strain state and quantitatively and visually representing evolution of a stress field.

The above embodiments in this specification are described in a progressive manner. Each of the embodiments is mainly focused on describing its differences from other embodiments, and references may be made among these embodiments with respect to the same or similar portions among these embodiments.

Based on the above description of the disclosed embodiments, those skilled in the art are capable of carrying out or using the present application. It is obvious for those skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

The embodiments described hereinabove are only preferred embodiments of the present application, and are not intended to limit the scope of the present application in any form. Although the present application is disclosed by the above preferred embodiments, the preferred embodiments should not be interpreted as a limitation to the present application. For those skilled in the art, many variations, modifications or equivalent replacements may be made to the technical solutions of the present application by using the methods and technical contents disclosed hereinabove, without departing from the scope of the technical solutions of the present application. Therefore, any simple modifications, equivalent replacements and modifications, made to the above embodiments based on the technical essences of the present application without departing from the technical solutions of the present application, are deemed to fall into the scope of the technical solution of the present application.

The invention claimed is:

1. A transparent device for constraining normal deformation of a plane model, comprising:
    a first transparent baffle and a second transparent baffle opposite to the first transparent baffle; wherein
    a first magnetic component is arranged at the first transparent baffle, and a second magnetic component corresponding to the first magnetic component is arranged at the second transparent baffle; in use, the plane model is constrained between the first transparent baffle and the second transparent baffle through mutual attraction of the first magnetic component and the second magnetic component.

2. The transparent device according to claim 1, wherein the first magnetic component comprises an active magnetic component or a passive magnetic component; and the second magnetic component comprises an active magnetic component or a passive magnetic component.

3. The transparent device according to claim 1, wherein both a normal direction of the first transparent baffle and a normal direction of the second transparent baffle are parallel to a normal direction of the plane model, the first transparent baffle and the second transparent baffle are symmetrically arranged with respect to the plane model, and the first magnetic component and the second magnetic component are symmetrically arranged with respect to the plane model.

4. The transparent device according to claim 1, wherein the first magnetic component is mounted at an edge of the first transparent baffle, and the second magnetic component is mounted at an edge of the second transparent baffle.

5. The transparent device according to claim 1, wherein
    at least one first magnetic component having a U-shaped structure is arranged at a top portion and/or a middle portion of the first transparent baffle, and a groove of the first magnetic component having the U-shaped structure is coupled to an edge of the first transparent baffle; and
    at least one first magnetic component having an H-shaped structure is arranged at a bottom portion of the first transparent baffle, an upper groove of the first magnetic component having the H-shaped structure is coupled to an edge of the first transparent baffle, and a lower groove of the first magnetic component having the H-shaped structure is coupled to a protrusion of a lower base.

6. The transparent device according to claim 5, wherein
    at least one second magnetic component having a U-shaped structure is arranged at a top portion and/or a middle portion of the second transparent baffle, and a groove of the second magnetic component having the U-shaped structure is coupled to an edge of the second transparent baffle; and
    at least one second magnetic component having an H-shaped structure is provided at a bottom portion of the second transparent baffle, an upper groove of the second magnetic component having the H-shaped structure is coupled to the edge of the second transparent baffle, and a lower groove of the second magnetic component having the H-shaped structure is coupled to a protrusion of the lower base.

7. The transparent device according to claim 6, wherein
    a first interlayer is provided between the groove of the first magnetic component having the U-shaped structure and the edge of the first transparent baffle;
    another first interlayer is provided between the upper groove of the first magnetic component having the H-shaped structure and the edge of the first transparent baffle;
    a second interlayer is provided between the groove of the second magnetic component having the U-shaped structure and the edge of the second transparent baffle; and
    another second interlayer is provided between the upper groove of the second magnetic component having the H-shaped structure and the edge of the second transparent baffle.

8. The transparent device according to claim 7, wherein
    the first magnetic component is extended in a thickness direction of the first transparent baffle, and the first magnetic component has a first protrusion protruding from a plane of the first transparent baffle toward the plane model;

the second magnetic component is extended in a thickness direction of the second transparent baffle, and the second magnetic component has a second protrusion protruding from a plane of the second transparent baffle toward the plane model; and in a case that the plane model does not receive a load, a sum of thicknesses of the first protrusion of the first magnetic component and the second protrusion of the second magnetic component which are symmetrically arranged at the first transparent baffle and second transparent baffle and thicknesses of the corresponding first interlayer and second interlayer is equal to a thickness of the plane model.

9. The transparent device according to claim 2, wherein the passive magnetic component is a permanent magnet; and the active magnetic component comprises a metal coil and a magnetic shield, the magnetic shield is a hollow structure which is circumferentially closed and axially unblocked, a curved surface of the metal coil is wrapped by the magnetic shield; the active magnetic component further comprises a power cord, an internal wire and a transformer, and the power cord, the transformer, the internal wire and the metal coil are connected in sequence.

10. The transparent device according to claim 1, wherein the first magnetic component is mounted in a region enclosed by an edge of the first transparent baffle, and the second magnetic component is mounted in a region enclosed by an edge of the second transparent baffle.

11. The transparent device according to claim 1, wherein at least one second magnetic component having a U-shaped structure is arranged at a top portion and/or a middle portion of the second transparent baffle, and a groove of the second magnetic component having the U-shaped structure is coupled to an edge of the second transparent baffle; and at least one second magnetic component having an H-shaped structure is provided at a bottom portion of the second transparent baffle, an upper groove of the second magnetic component having the H-shaped structure is coupled to the edge of the second transparent baffle, and a lower groove of the second magnetic component having the H-shaped structure is coupled to a protrusion of the lower base.

* * * * *